United States Patent [19]
Snyder, Jr. et al.

[11] Patent Number: 5,526,297
[45] Date of Patent: Jun. 11, 1996

[54] RANDOM UNIQUE WORD DETECTION METHOD AND APPARATUS

[75] Inventors: John S. Snyder, Jr., Monrovia; Susan P. Miller, Rockville, both of Md.

[73] Assignee: Comsat Corporation, Bethesda, Md.

[21] Appl. No.: 282,021

[22] Filed: Jul. 29, 1994

[51] Int. Cl.[6] .................................................. H04L 7/00
[52] U.S. Cl. ........................... 364/715.11; 375/368
[58] Field of Search ..................... 364/715.11; 375/368

[56] References Cited

U.S. PATENT DOCUMENTS

| | | | |
|---|---|---|---|
| 4,787,095 | 11/1988 | Forth et al. | 375/368 |
| 4,847,877 | 7/1989 | Besseyre | 364/715.11 |
| 5,025,458 | 6/1991 | Casper et al. | 364/715.11 |
| 5,199,050 | 3/1993 | Linsky | 364/715.11 |
| 5,313,500 | 5/1994 | Rikiyama | 375/368 |
| 5,383,142 | 1/1995 | Chung | 364/715.11 |

*Primary Examiner*—David H. Malzahn
*Attorney, Agent, or Firm*—Sughrue, Mion, Zinn, Macpeak & Seas

[57] ABSTRACT

Method for randomly detecting a unique word comprising M bits in a predetermined number of segments within a frame containing L bits of data, where M and L are integers greater than one and wherein M is less than L, includes steps for (a) randomly sampling the data to thereby obtain the segments, (b) comparing a first segment of the segments with the first portion of an actual unique word so as to permit determination of a match between the first segment and the first portion of the actual unique word, (c) when a match is found between the first segment and the respective portion of the actual unique word, comparing a next segment of the segments with the next portion of the actual unique word, (d) when a match is found between the next segment and the next portion of the actual unique word, repeating step (c) until all of the segments are matched with corresponding portions of the actual unique word, and (e) when the comparison of any segment does not result in an appropriate match, returning to step (a) to begin a new search with a new random sample.

16 Claims, 6 Drawing Sheets

RANDOM UNIQUE WORD DETECTION METHOD AND APPARATUS

FIELD OF THE INVENTION

The present invention relates generally to a method for detecting the occurrence of unique words in a data stream. More specifically, the present invention relates to a method for detecting the occurrence of unique words in a data stream using random sampling.

BACKGROUND OF THE INVENTION

Digital communications systems commonly employ special data patterns for synchronization purposes. These carefully-selected n-bit patterns, which are called unique words, are imbedded in the transmittal data to provide a mechanism for aligning the receive-side signal processing functions with the received data.

Early work on the use of unique words in TDMA applications is described in the paper entitled "Unique Word Detection in Digital Burst Communications," by W. Schrempp et al., IEEE Transactions on Communications Technology, Vol. COM-16, No. 4, August 1968, pp. 597–605, which paper analyzed unique word detection in terms of false detection probability, missed detection probability and unique word correlation properties. The paper also described a basic unique word detector as consisting of an n-bit shift register, n modulo-2 adders, and a summation and threshold network.

Since the unique word is generally known to occur periodically, false detection performance may be enhanced by gating the detector output with an aperture signal (or detection window) which is active in the region of expected unique word occurrence, as described in the above-referenced paper. Because only those detections which coincide with the aperture gate are considered, false detections occurring outside the aperture limits are rejected.

However, the most computationally intensive part of the unique word detection process in the initial acquisition, or open aperture mode of operation. In this operating mode, little or no information is usually available as to the location of the unique word, so all possibilities are typically considered in an exhaustive search.

The article by B. H. Warner, Jr., entitled "Build High-Speed Sync-Pattern Detectors," Electronic Design, Oct. 11, 1975, pp. 82–85, described two approaches used successfully is unique word detectors operating at speeds above 50 Mbit/s. The first approach used standard emitter-coupled logic (ECL) functions to implement the detector as an n-bit shift register, an n-bit adder tree, and a digital comparator. In the second approach, high-speed programmable read-only memories (PROMs) were used to implement the adder function as a code converter.

Both of these high-speed unique word detectors were designed to perform a complete unique word detection for every data clock cycle. At the beginning of each clock cycle, the serial bit stream was shifted by one bit and the potential unique word was checked against the detection criteria. In addition to the difficulties inherent in implementing the detection function at high speed, these approaches become more complicated when the unique word is spread throughout the data, rather than being clustered in one portion of the frame.

At more moderate data rates, however, it is quite practical to implement a real-time unique word detector using various commercially available correlation chips. Such a detector can readily perform an exhaustive search until the unique word is located.

At the opposite extreme from the high-speed hardware detector is an approach in which an amount of data equal to an entire frame (i.e., the amount of data from one unique word to the next) is stored in memory. The stored data may then be slowly searched for the unique word in an exhaustive manner. New data which are received during the unique word search are kept track of by means of a counter, so that the desired unique word reference point can be established relative to the current data stream once the unique word is found. This approach is particularly well-suited for low data rate applications employing a microprocessor or digital signal processor (DSP) chip, where the unique word detection algorithm and other signal processing can be conveniently performed via software.

Any unique word detection technique has some possibility of failure due to the chance of either a false detection or a missed detection. The probability of either of these occurrences is usually kept negligibly low by the choice of the unique word size and the allowable number of errors. However, each of the conventional methods described above involves an exhaustive search in a predetermined manner until a detection occurs.

SUMMARY OF THE INVENTION

The principal purpose of the present invention is to provide an efficient method for detection of unique words embedded in a stream of data.

An object according to the present invention is to provide a method of detecting the occurrence of a unique word in data dependent on the frame size of the data and the number of detection attempts.

Another object according to the present invention is to provide a method of detecting the occurrence of a unique word in data independent of the spreading distance associated with the unique word.

Yet another object according to the present invention is to provide a method for detecting a unique word occurring in a data stream by comparison of a plurality of data segments collectively comprising the unique word with the actual unique word. According to one aspect of the invention, a bit-by-bit match between each bit in the segments and the actual unique word is required in order to determine that the unique word has been located. According to another aspect of the invention, criteria other than bit-by-bit matching can be employed in unique word detection.

These and other objects, features and advantages according to the present invention are provided by a method for randomly detecting a unique word comprising M bits in a predetermined number of segments within a frame containing L bits of data, where M and L are integers greater than one and wherein M is less than L. The method includes steps for:

(a) randomly sampling the data to thereby obtain the segments;

(b) comparing a first segment of the segments with a respective first portion of an actual unique word so as to permit determination of a match between the first segment and the first portion of the actual unique word;

(c) when a match is found between the first segment and the first portion of the actual unique word, comparing a next segment of the segments with a respective next portion of the actual unique word according to a predetermined unique word detection criteria;

(d) when a match is found between the next segment and the respective next portion of the actual unique word, repeating step (c) until all of the segments are matched with corresponding portions of the actual unique word according to the predetermined unique word detection criteria; and (e) when the comparison of any segment of the segments does not result in an appropriate match, immediately terminating the current search and beginning a new search with a new random sample by returning to step (a).

These and other objects, features and advantages of the invention are disclosed in or apparent from the following description of preferred embodiments.

BRIEF DESCRIPTION OF THE DRAWINGS

The preferred embodiments are described with reference to the drawings in which like elements are denoted by like or similar numbers and in which:

FIG. 3A is a high level block diagram of a signal processing circuit particularly useful in performing the random unique word detection according to the present invention while

DESCRIPTION OF THE PREFERRED EMBODIMENTS

Before describing the actual method and corresponding apparatus for random unique word detection according to the present invention, a brief overview of the principles behind the inventive method will first be discussed.

Random unique word detection is based on the idea that it is unnecessary to start at some point in a data sequence and doggedly process all received data in order to find the unique word. The complexity of the unique word detection process may be simplified by selecting data samples randomly and ignoring new data which occur during the processing of a sample. The cost of random processing is that, on the average, a larger number of data samples must ultimately be processed to achieve a desired performance level.

In a random unique word search, each data sample is selected in an arbitrary manner, rather than according to a predetermined sequence. Therefore, a random unique word detector will never perform an exhaustive search with absolute certainty. The performance of the random detector can only be described probabilistically and is a function of the unique word size, the frame length, and the number of random selections made.

Since the performance of a random unique word detector is probabilistic, an equation can be developed for the probability that the unique word is contained within a large number of random data samples, given that the unique word is transmitted as n consecutive data bits, thereby establishing the basic probability relationship on which the invention is based. This case is then generalized to that where the unique word is spread throughout the frame. Then, the specific elements of the invention are itemized for the general case. Finally, the random unique word detector will be further described using another example, for which actual probability calculations are made.

1. Probability of Unique Word Selection

Figure 1:
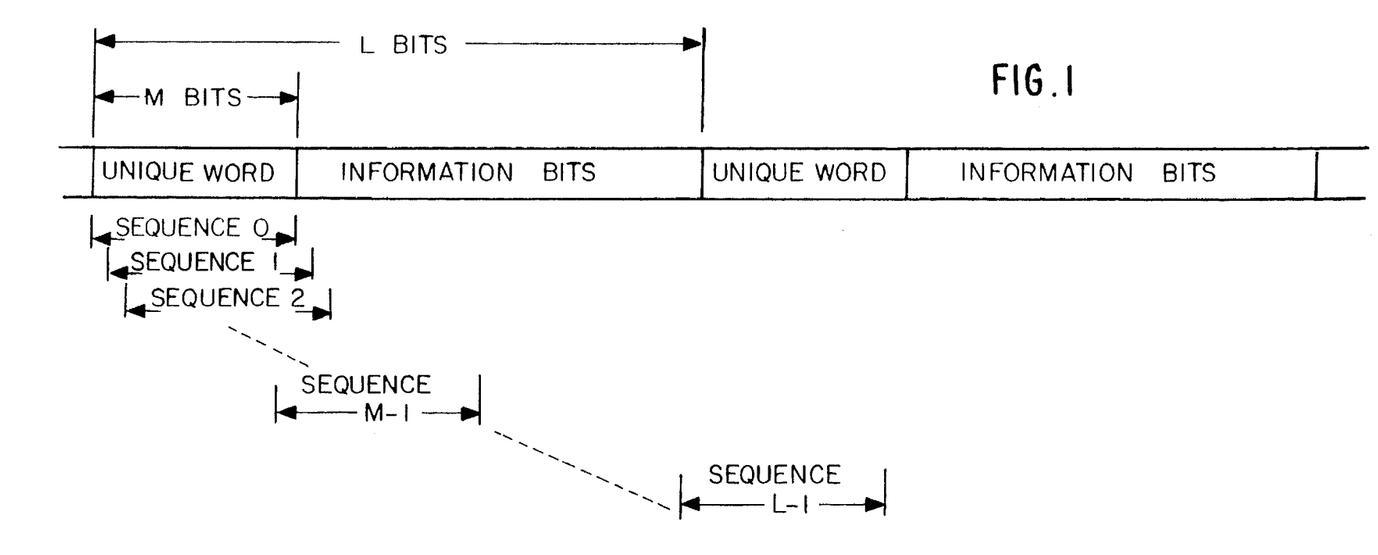
FIG. 1 is a conceptual view of several data frames which is useful in understanding the present invention.

As shown in FIG. 1, data advantageously can be formatted in L-bit frames, such that M consecutive unique word bits are followed by (L-M) information bits and the process repeats every L bits. For each of the L bits within a frame, an M-bit sequence starting with that bit can be included. Of the L such sequences be*ginning in each frame, only one contains the entire M-bit unique word. Therefore, the probability that any M-bit data sample drawn from such a bit stream contains the entire unique word is $$P=1/L \qquad (1)$$

The probability that none of N randomly selected M-bit sequences contains the unique word is given by the expression:

$$Q_N=(1-P)^N$$

Therefore, the probability that the entire unique word is contained within at least one of N randomly selected M-bit samples is given by equation (2) as follows:

$$P_N=1-Q_N=1-(1-P)^N \qquad (2)$$

It will be appreciated that this probability may be made arbitrarily close to unity by increasing the number of samples, N.

Figure 2:
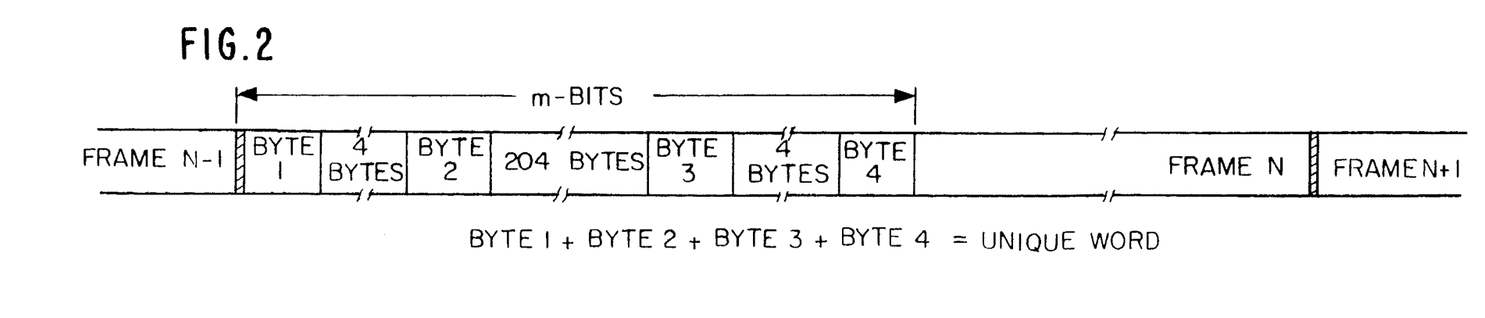
FIG. 2 is another conceptual diagram which is useful in understanding the concept of distributing a unique word over a predetermined spreading distance.

The analysis presented immediately above can advantageously be repeated for the case in which each unique word is spread over exactly m bits, i.e., spreading distance m, as shown in FIG. 2. Preferably, each of the L bits in a frame is considered to head an m-bit sequence. Again there are L such sequences per frame, only one of which contains the entire unique word. Therefore, the probability that a random m-bit data sample contains the unique word is given by equation (1). The probability that at least one of N random m-bit samples contains the unique word is again given by equation (2).

The probability of selecting the sequence which contains the unique word is, thus, a function of frame length (L) and number of attempts (N), but is not a function of the spreading distance (m) of the unique word. Although the spreading distance of the unique word does determine the nominal size of the sequences to be processed, in practice it is not necessary to capture an entire m-bit sequence. Furthermore, as will be shown in the detailed examples which follow, most samples can be rejected based upon processing of only a fraction of the sequence.

For each random sample chosen for processing, there are two objectives, namely:

(1) If the unique word is present, maximize the probability of detecting the unique word. That is, the probability of a missed detection should be low.

(2) If the unique word is not present, minimize the probability of a false detection.

It will be noted that in a random data sample which is arbitrarily chosen, for practical purposes, the data sample must conform to a size criterion described in greater detail below. In practice, the random data sample is further divided into conveniently sized segments, such as bytes, for actual data capture and processing. As discussed in greater detail below, it is typically only necessary to process a single segment of a data sample, since most data samples will be rejected based on the first segment.

Although random unique word detection requires the processing of more data samples than does conventional detection, the use of random data samples and segmentation of these samples allows the random unique word detector to be implemented with simpler hardware and/or software. It will be appreciated that hardware simplification makes random unique word detection especially well-suited to high-speed data applications. Moreover, random detection probability may be made arbitrarily high, while being achieved in a reasonably short time.

The random unique word detector trades off hardware complexity (e.g., no high-speed processing nor large memory is required) for a greater number of data samples needing to be processed. Although the search is not exhaustive, the probability of success may be made arbitrarily high within a modest amount of time. All of this can be accomplished with simple hardware and software.

Random unique word detection will now be described in general terms, followed by discussion of a practical example of a system using the method according to the present invention. The specific examples will provide a clearer understanding of the relationships between the processing functions and the format of the data.

2. General Random Unique Word Detection Method

The operating steps necessary for performing random unique word detection include the following steps:

(1) Selecting a data sample length, m, which must be equal to the number of bits over which the unique word is spread. It will be appreciated that this step is dictated by the format of the unique word as it occurs in the data stream.

(2) Selecting conveniently sized segments, e.g., bytes, of the data sample to be used for actual processing, i.e., unique word detection.

It will also be appreciated that these first two steps are generally performed only during design of the system, which advantageously can be either the design of dedicated hardware for random unique word detection or software development for a programmable signal processing system. In other words, the selected unique word and its associated distribution in a data frame must be taken into account only once for any particular class or model of machine.

(3) Formatting the received data so as to facilitate random sampling. This may advantageously include performing serial-to-parallel conversion under the control of a random "load" pulse, as described in greater detail below.

(4) Providing at least one appropriate random control signal to the formatting device employed in step (3) and maintaining the control state dictated by the applied control signal during the processing of the data sample.

(5) Obtaining a first segment of the random sample to be processed.

(6) Processing the first segment according to predetermined unique word match criteria. Preferably, this can be a comparison of the appropriate bits of the first segment with the respective bits of a first portion of the actual unique word. More relaxed criteria can advantageously be used, such as coincidence between a predetermined number of bits in the first segment with the bits from the respective first portion of the actual unique word, to ensure that a unique word containing a reception error is still detected as a unique word.

(7) Repeatedly obtaining and processing segments, i.e., repeating steps (5) and (6), as appropriate, according to the predetermined overall unique word match criteria, until either a failure to match occurs or a complete unique word match is obtained.

(8) When a match failure occurs, jumping back to step (4) so as to initiate a new random sample.

(9) When all segments of a sample match respective portions of the actual unique word, declaring initial acquisition (open aperture operation) completed and taking appropriate action, such as initiating a closed aperture search mode of operation. It will be appreciated that in programmable signal processors, a data flag indicative of open or closed aperture detection can advantageously be used to instruct a processor to change modes of operation.

3. EXAMPLE 1

The present invention will now be explained in greater detail referring to the high level block diagrams of FIGS. 3A and 3B and the flow chart of FIG. 4.

Figure 3A:
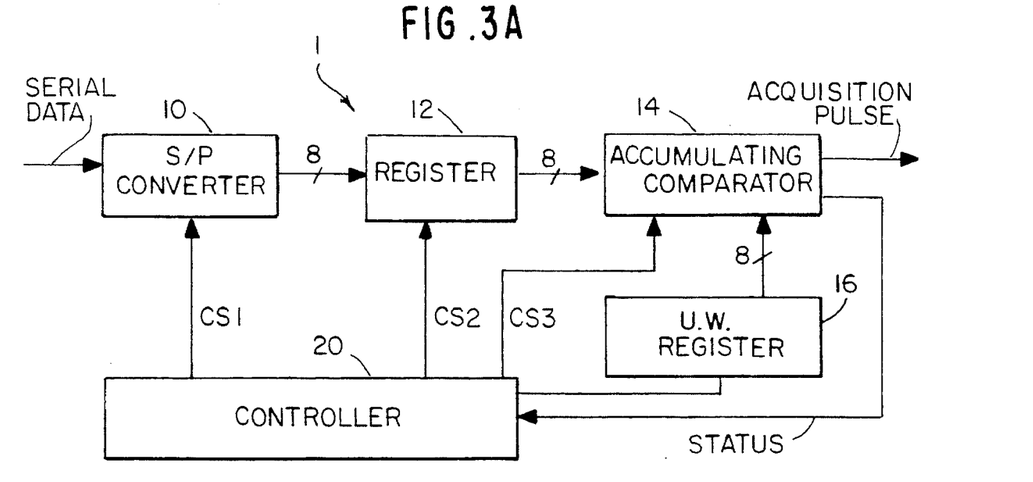
Figure 3B:
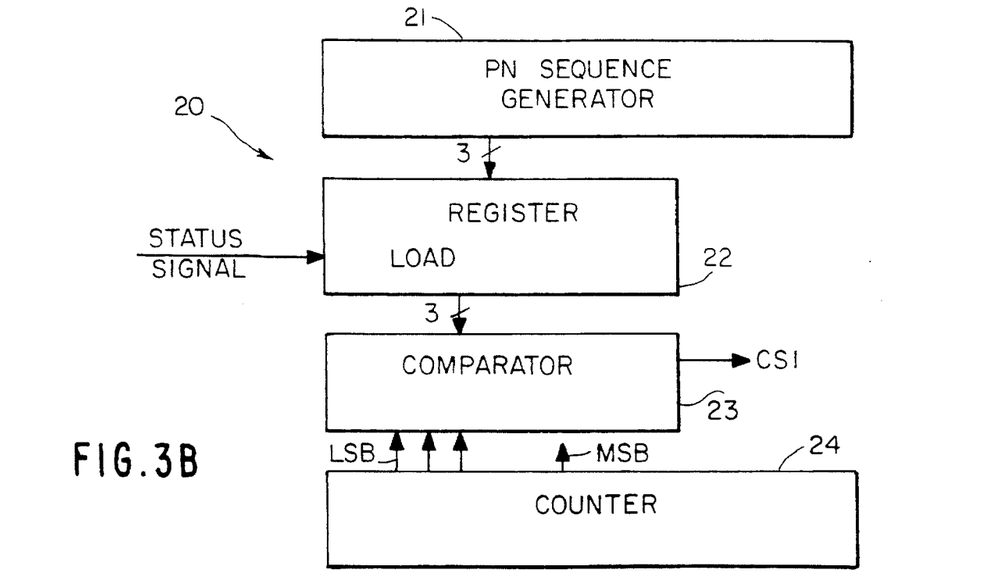
FIG. 3B is a block diagram of an exemplary controller illustrated in FIG. 3A.

Referring first to FIG. 3A, a unique word detector 1 according to the present invention includes a serial-to-parallel (S/P) converter 10 receiving serial data including the unique word and generating parallel data applied to a register 12. An accumulating comparator 14 receives data from both register 12 and a cache register 16 connected thereto. In an exemplary case, cache register 16 may be recirculating register.

A controller 20 controls the operation of S/P converter 10, register 12, accumulating comparator 14 and cache register 16. As shown in FIG. 3B, controller 20 may advantageously include a pseudo-noise (PN) sequence generator 21, a controller register 22, a controller comparator 23, and a data counter 24.

When a status signal from accumulating comparator 14 indicates that correlation failure has occurred, the signal applied to register 22 is changed to thereby cause controller register 22 to load a predetermined number of bits from PN sequence generator 21. In an exemplary case, the status can be a logic level signal wherein the level goes high when a match failure occurs in comparator 14, causing controller register 22 to load replacement bits. As shown in FIG. 3B, 3 bits are loaded each time the status signal indicates a match criteria failure.

Comparator 23 compares the bits stored in controller register 22 with the output of counter 24 and generates control signal CS1 for application to S/P converter 10 whenever a match occurs between the bit groups. In response to signal CS1, S/P converter 10 provides another byte to register 12 of FIG. 3A. It will be appreciated that the signal CS1 may be termed a pseudo-randomly phased control signal, since the signal CS1 is generated in response to every eighth count of counter 24 but the phase, i.e., the starting bit for each byte, is determined by the pseudorandomly-generated bits in register 22. It will also be appreciated that PN sequence generator 21 advantageously can be replaced by either a pseudorandom number generator or another type of pseudorandom generator or a true random number generator.

Figure 4:
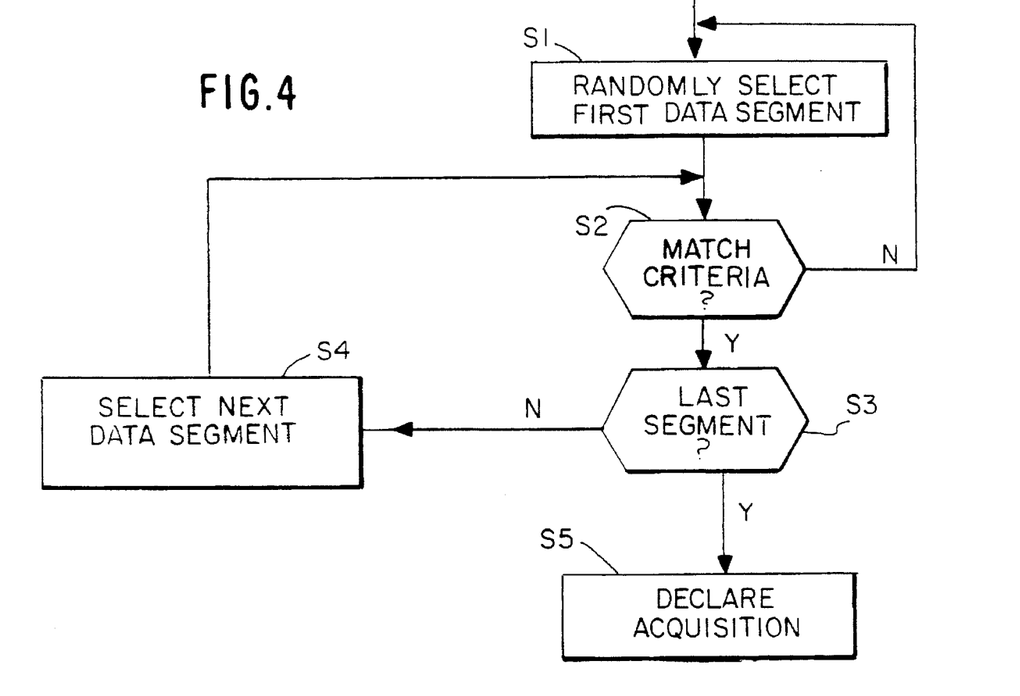
FIG. 4 is a flowchart depicting the essential steps according to the method of the present invention.

Referring to FIG. 4, which is a flow chart illustrating a preferred unique word detection method according to a preferred embodiment of the invention, during step S1, a first data segment is randomly selected from incoming data bits. Advantageously, the control signal CS1 applied to S/P converter 10 by controller 20 provides selection of data segments, which segments are then stored in register 12.

During step S2, a comparison is performed between the selected data segment and a respective portion of the unique word to determine whether the data segment satisfies predetermined match criteria. If a match failure occurs, the flow chart loops back to initiate random data segment selection during step 1 S1. However, if a match is detected, a test is performed during step S3 to determine whether a data segment corresponds to a last portion of the unique word. If the answer is negative, a next data segment is selected during step S4 and the program repeats step S2 and S3 until the last segment is detected. It will be appreciated that this repetitive performance of steps S2 and S3 is performed as long as the match criteria is satisfied. A negative response at step S2 results in the program looping back to the start of step S1. When the last segment is detected during step S3, i.e., the determination is affirmative, the program steps to S5, where an acquisition is declared. Comparator 14 advantageously provides an acquisition pulse when acceptable overall correlation between all data segments stored in register 12 and the actual unique word stored in register 16 is achieved. As discussed above, declaration of acquisition can advantageously be used to cause a mode shift in the processor.

4. EXAMPLE 2

Another exemplary application of the random unique word detection method will now be explained with respect to an Intermediate Data Rate (IDR) outer codec, which advantageously can be used for systems requiring compliance with the standard entitled "Performance Characteristics for Intermediate Data Rate (IDR) Digital Carriers," INTELSAT Document lESS-308 (Rev. 6B), 04 Dec. 1992. It will be noted that the exemplary a unique word which is spread over a large portion of the data. See FIG. 2. Moreover, the example illustrates the application of the invention to more complicated cases in which selecting the random data samples involves complex formatting operations performed on the data.

Figure 5:
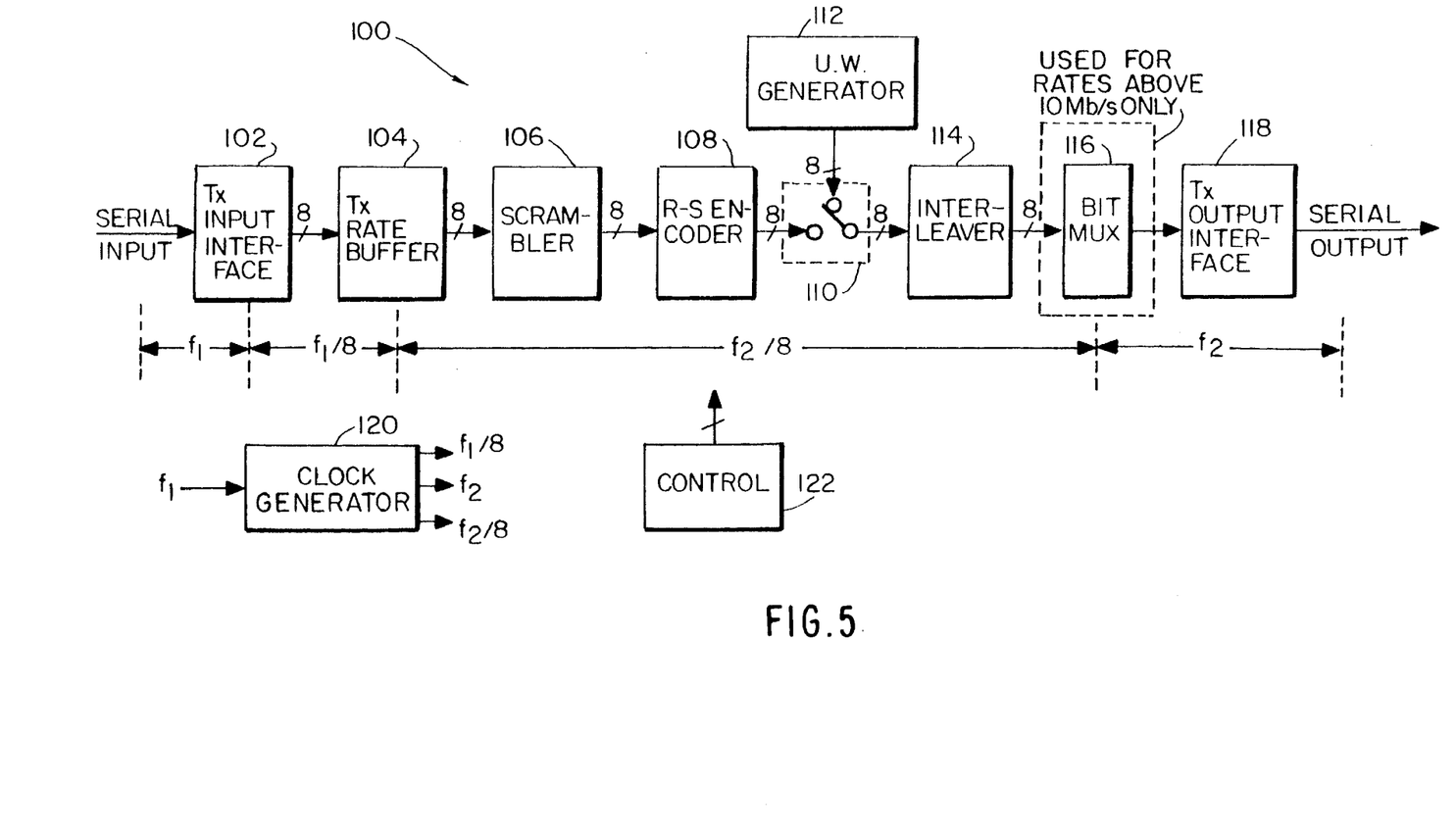
FIG. 5 is a high level block diagram of an Intermediate Data Rate (IDR) outer encoder which is useful in understanding generation and emplacement of a unique word in a data stream.

As shown in FIG. 5, the transmit input interface 102 outer encoder 100 receives serial data and provides parallel data to a transmit rate buffer 104, which provides parallel data to a conventional scrambler 106. Scrambler 106, in turn, provides data to Reed-Solomon encoder 108. A switch 110 selectively receives data from Reed-Solomon encoder 108 and unique word generator 112, in response to control signals generated by control circuit 122. It will be appreciated that control signals from control circuit 122, as well as clock signals from clock generator 120, are provided to each of the circuit elements in FIG. 5 and FIG. 6, which will be discussed in greater detail below.

The output of switch 110 is applied to a bit multiplexer 116 via interleaver 114, which interleaver generates the byte sequence illustrated in FIG. 2. The output of bit multiplexer 116, which is discussed in greater detail with respect to FIG. 6, is then applied to transmit output interface 118.

Figure 6:
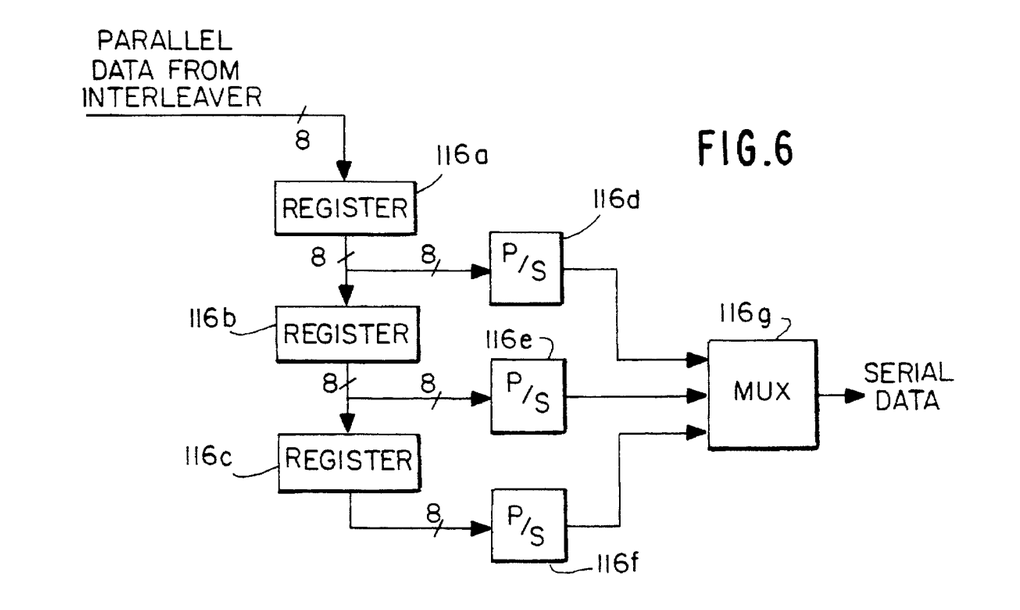
FIG. 6 is a low level block diagram of a bit multiplexer employed in the outer encoder illustrated in FIG. 5.

As shown in FIG. 6, parallel data from interleaver 114 is applied to bit multiplexer 116. Advantageously, bit multiplexer 116 includes register stages 116a, 116b and 116c, parallel to serial converters 116d, 116e and 116f as well as multiplexer 116g.

Figure 7:
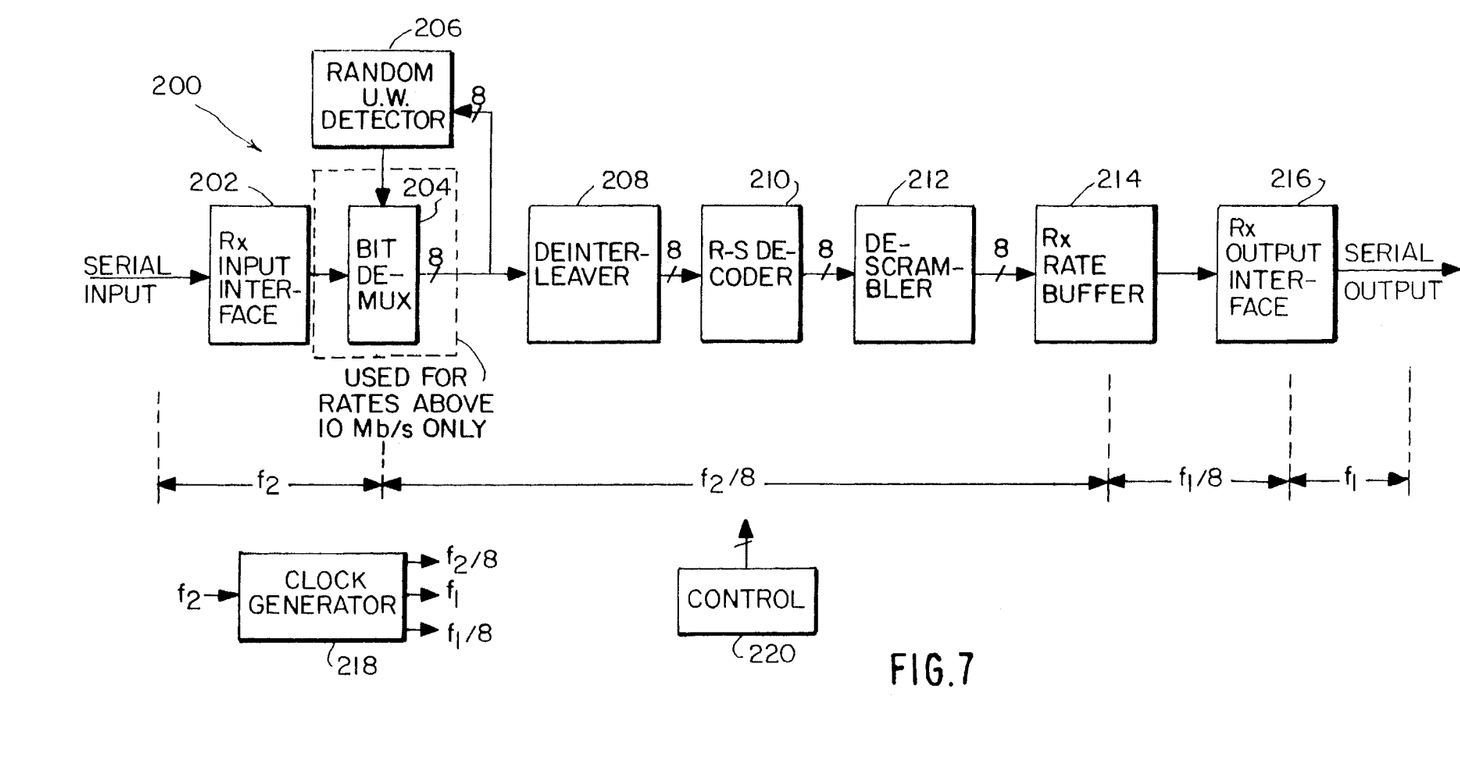
FIG. 7 is a high level block diagram of an IDR outer decoder which is useful in explaining random unique word detection according to the method of the present invention.

As shown in FIG. 7, the outer decoder 200 includes a receive input interface 202, a bit demultiplexer 204 providing parallel data to both random unique word detector 206 and deinterleaver 208. After further processing, by Reed-Solomon decoder 210, descrambler 212, and receive rate buffer 214, serial data is ultimately provided by receive output interface 216. It will be appreciated that clock generator 218 provides timing signals to each of the circuit blocks illustrated in FIGS. 7 and 8 while control circuit 220 provides control signal to these respective blocks.

Figure 8:
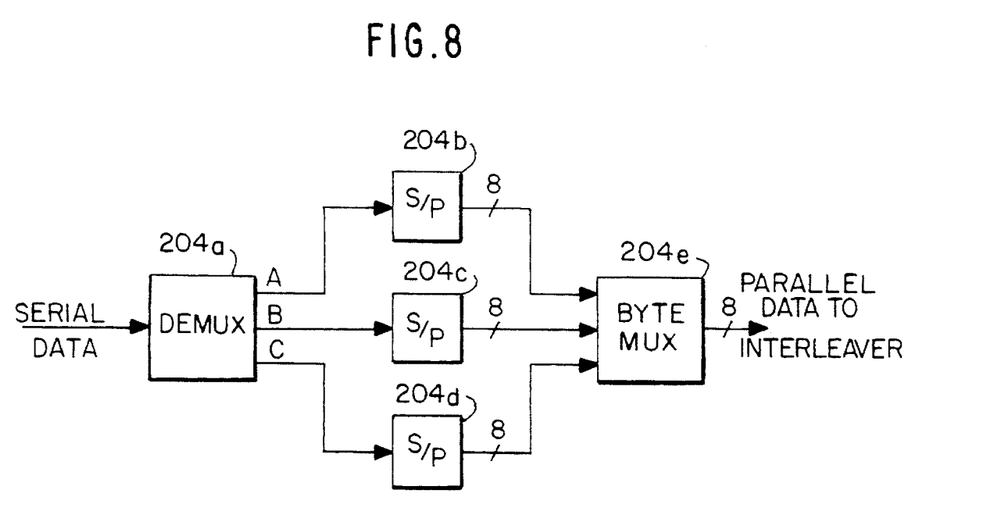
FIG. 8 is a low level block diagram of a bit demultiplexer which is advantageously found in the outer decoder of FIG. 7.

As shown in FIG. 8, the demultiplexer 204 includes the demultiplexer 204a, a plurality of serial-to-parallel converters 204b, 204c and 204d and byte multiplexer 204e. As discussed above, the output of byte multiplexer 204e is provided to interleaver 208 and unique word detector 206, as shown in FIG. 7.

At information rates above 10 Mbit/s, an IDR outer encoder 100 is required to perform a special multiplexing operation on the bit stream, which impacts unique word detection. This special function consists of grouping three successive bytes and selecting their bits such that the resulting serial bit stream consists of bit 1 from the first byte, bit 1 from the second byte, bit 1 from the third byte, bit 2 from the first byte, etc. This bit multiplexing function may be accomplished by clocking the output bytes from interleaver 114 through three register stages 116a, 116b and 116c, as shown in FIG. 6. For every third cycle of the byte clock generated by clock generator 120, a load command enters the three bytes into their respective parallel-to-serial converters 116d, 116e, and 116f, from which they are clocked out on three serial paths. The three serial bit streams are then multiplexed together on a bit-by-bit basis by multiplexer 116g. Thus every three-byte grouping is converted into a multiplexed 24-bit serial sequence.

On the receive side, IDR outer decoder 200 receives a serial bit stream from a demodulator (not shown) which is essentially the same bit stream produced by the multiplexer 116, except for some uncorrected transmission errors. This bit stream passes through the bit demultiplexer shown in FIGS. 7 and 8, which performs the inverse of the bit multiplexing operation performed by multiplexer 116.

Thus, the composite serial bit stream is separated into the original three serial bit streams by demultiplexer 204a. Each of the three serial bit streams is then formatted into 8-bit bytes by serial-to-parallel converters 204b, 204c, and 204d, the outputs of which are multiplexed, byte-by-byte, in byte multiplexer 204e to recover the same parallel data format which had existed at the input to the bit multiplexer 116. In order to put the three serial bit streams in the correct order and properly perform the serial-to parallel conversion, control signals from the random unique word detector are needed. These will be discussed shortly.

In this example, a 32-bit unique word is initially inserted in the data stream as four separate bytes. An interleaver 114 function in the outer encoder 100 causes the first two unique word bytes to be separated such that they are spread over five data bytes, as are the last two unique word bytes, as well. See FIG. 2. The separation between the second and third bytes, however, becomes 204 bytes. Therefore, the unique word bytes at the interleaver 114 output are spread over 214 data bytes.

Since the bit multiplexer 116 operates on three-byte groups, the unique word bytes will be spread over the next larger byte interval which is exactly divisible by three. Therefore, in the serial output of the bit multiplexer, the unique word will be spread over 216 bytes, or 1728 bits, i.e., a spreading distance of 1728 bits.

In this example, the frame size is (48×208) bytes, i.e., 79,872 bits, long. From equation (1), the probability that any particular 1728-bit sequence contains the entire unique word is $$P=1/79,872=0.00001252,$$

since there are 79,872 different possible 1728-bit sequences for each frame. The probability, $P_N$, that at least one of N randomly selected 1728-bit samples contains the unique word is given by equation (2). This probability may be made arbitrarily close to unity by increasing the number of samples, N. As shown in Table 1, which lists the probability that at least one of N random samples contains the unique word for a frame length of 79,872 bits, high probabilities advantageously may be obtained for quite reasonable values of N.

TABLE 1

| N | $P_N$ |
| --- | --- |
| 200,000 | 91.8% |
| 300,000 | 97.6% |
| 400,000 | 99.3% |
| 500,000 | 99.8% |

As mentioned previously, it is not actually necessary to capture an entire 1728-bit sequence. Using an arbitrary starting point with an arbitrary byte boundary, one byte from the bit demultiplexer 204 output is checked as a possible first unique word byte and a second one taken four bytes later is checked for being the second unique word byte. Only if both bytes pass the test, is a third byte selected at a location 204 bytes later. Finally, only when three such bytes produce a satisfactory match, is the final byte, located 4 bytes after the third byte, tested.

If a failure to match the expected pattern occurs at any point in the processing of a data sequence, the sequence is abandoned and a new random sample with a new random byte boundary is selected. In the vast majority of cases, the first byte in a sample will fail to match the first 8 bits of the unique word pattern, thereby greatly speeding the unique word search.

Selecting a new random sample consists of randomly choosing a new demultiplexer 204a starting point, randomly choosing a new byte boundary and selecting a byte from the output of the byte multiplexer 204e. Choosing the demultiplexer 204a starting point means determining whether the current input bit is steered to output A, B or C. Once this decision is made, the next input bit must be directed to the next appropriate output such that bits are always directed in the order . . . , C, A, B, C, A, B, C, A, . . . In the exemplary case, choosing the byte boundary means supplying a load command simultaneously to the three serial-to-parallel converters 204b, 204c and 204d to arbitrarily specify the beginning of each byte. Note that when the unique word is finally detected, the control signals which determine demultiplexer 204a starting point and byte boundaries need simply be maintained.

The significance of choosing the nominal length of the m-bit sample to be exactly the minimum necessary to contain the unique word (i.e., 1728 bits) is somewhat subtle, but important. From a theoretical point of view, it preserves the randomness which is required for equation (2) by guaranteeing that every sample is independently obtained. From a practical point of view, this choice means there is only one way of formatting the data. Advantageously, there are no additional bits to shift in, which would require checking multiple data pattern possibilities and would also create multiple byte boundary possibilities. These multiple possibilities consume more in extra processing than the minimum sample length does, without a corresponding improvement in performance. As noted above, the first byte of a sample fails to match in the vast majority of cases, allowing the sample to immediately be abandoned with a positive impact on detection speed.

Since the IDR outer codec specification allows up to one error in the unique word during initial acquisition, the probability of a missed detection is given by $$P_{miss}=1-q^n-npq^{n-1}$$

where n=32 is the unique word length, p is the probability of a bit error, and (q=1−p) is the probability of a correct bit. The second term ($q^n$) represents the probability of the unique word being received correctly, while the third term represents the probability that exactly one of the unique word bits is in error.

For a bit error probability of $10^{-7}$ at the output of the inner decoder, $$P_{miss} \approx n(n-1)p^2 \approx (np)^2,$$
$$\approx 10^{-11}.$$

It will be appreciated that allowing one error has reduced the missed detection probability by about five orders of magnitude from its value (np=3.2×$10^{-6}$) with no errors. Since the probability of a correct detection is the product of the probability of not missing and the probability of the unique word being present, the probability of a correct detection is essentially the probability of the unique word being present, as given by Equation (1), which, as discussed above, can be made arbitrarily close to unity.

However, the false detection probability, given by $$P_{false}=(n+1)/2^n$$

is adversely affected by allowing an error, since that is what accounts for the factor n in the numerator. This equation yields the probability that a sample of random data will result in an n-bit pattern that matches the unique word exactly or with a single bit in error. For n=32, $P_{false}$=7.68× $10^{-9}$.

It will be appreciated that the much higher probability of falsely detecting the first of the four unique word bytes is of little concern. The important thing is that the probability of detecting the entire unique word, as given above, is small. In fact, the probability of falsely detecting both of the first two unique word bytes is fairly low.

Since a random detection scheme would involve the processing of more samples than would an exhaustive search, one might be concerned about the overall false detection probability for a large number of samples. Probably more meaningful is the probability of no false detection in N samples, which is given by the expression $$(1-P_{false})^N \approx 1-NP_{false}$$

For 200,000 samples the probability is 99.85% that there will be no false detection. Even for 500,000 samples the probability of no false detection is still 99.62%.

Most of the time (i.e., the most probable case), only one byte of a sample will have to be checked. The result, in these cases, will be that the unique word will not be present, a false detection will not occur, and the unique word detection cycle will start over again with a new random sample. Assuming that this case requires 10 instruction cycles to process and a 100-ns (i.e., 10-MHz) processor instruction cycle is used, the time required to process 200,00 samples would be about 0.2 sec, which seems reasonable for initial acquisition.

After the first unique word detection, searches are generally limited to the expected locations of subsequent unique words. During this closed aperture operation, virtually an entire unique word frame period is available to process one potential unique word sequence. If a loss of synchronization occurs, as defined by a specific system criterion, operation generally reverts back to the open aperture mode.

Closed aperture operation, by definition, involves processing a sample (or samples) from a specific location within the received data stream, which precludes random sampling. Therefore, random unique word detection applies only to detection in the open aperture mode.

It will be appreciated that the inventive method and apparatus are equally applicable to a first unique word format embedded in data transmitted as a serial bit stream, but composed of bytes of data, and a second unique word format such as a 32-bit unique word which is transmitted as four (4) 8-bit bytes, with each of the last 3 bytes separated a predetermined distance "d" from the immediately preceding byte. In the latter case, the data is preferably formatted into bytes as the first operation (the parallel-to-serial [P/S] converter). It will also be appreciated that the "byte boundary" can advantageously be randomly (or pseudo-randomly) selected. The "byte boundary" refers to the division between the last bit of one byte and the first bit of the next byte. Once selected, the byte boundary is held constant by the control block, until failure to match occurs, during subsequent data samples loaded into the register, e.g., register 12 of FIG. 3A.

It will also be noted that, in general, the unique word does not have to be sub-divided into nice, neat bytes, but may be interleaved so as to appear in every other bit in the byte. It may also be sub-divided into 4-bit segments, which advantageously occur as the upper (most significant) bits in a byte, etc. As those of ordinary skill in the art will immediately appreciate from the foregoing discussion, data may be treated as single bits, 4-bit nibbles, 7-bit PCM characters, 16-bit words, etc., rather than 8-bit bytes.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of randomly detecting a unique word comprising M bits in a predetermined number of segments within a frame containing L bits of data, where M and L are integers greater than one and wherein M is less than L, said method comprising the steps of:

(a) randomly sampling said data to thereby obtain said segments;

(b) comparing a first segment of said segments with a respective first portion of an actual unique word so as to permit determination of a match between said first segment of said segments and said first portion of said actual unique word;

(c) when a match is found between said first segment and said first portion of said actual unique word, comparing a next segment of said segments with a respective next portion of said actual unique word;

(d) when a match is found between said next segment of said segments and said next portion of said actual unique word, repeating step (c) until all of said segments are matched with corresponding portions of said actual unique word; and (e) when comparison of said next segment of said segments and said next portion of said actual unique word fails to result in an appropriate match, returning to step (a) to begin a new search with a new random sample and discarding said data located between said random sample and said next random sample.

2. The method as recited in claim 1, wherein said step (a) comprises the steps of:

(f) generating a random control signal identifying a first bit of said segments; and (g) sampling said data to thereby obtain said segments based on location of said first bit in said data.

3. The method as recited in claim 16, wherein said step (a) comprises the steps of:

(h) pseudorandomly generating at least one control signal to format said data so as to readily obtain said segments; and (i) obtaining only said ith segment of said segments.

4. The method as recited in claim 1, wherein said step (a) comprises the steps of:

(j) pseudorandomly generating at least one control signal;

(k) formatting said data responsive to said control signal by performing steps for:
      (i) demultiplexing serial data to thereby produce first and second serial data streams;
      (ii) converting each of said first and second data streams to first and second parallel data streams; and
      (iii) multiplexing said first and second parallel data streams to produce parallel data to format said parallel data so as to thereby readily obtain said first segment of said segments; and (l) sampling said data to thereby obtain said segments based on location of said first bit in said data.

5. The method as recited in claim 16, wherein said step (a) comprises the steps of:

(m) randomly generating at least one control signal so as to permit formatting of said data to thereby readily obtain said segments; and (n) obtaining only said ith segment of said segments.

6. The method as recited in claim 16, wherein said step (a) comprises the steps of:

(o) randomly generating at least one control signal;

(p) formatting said data in response to said control signal to produce parallel data so as to format said parallel data to thereby readily obtain said segments; and (q) obtaining said ith segment of said segments from said parallel data.

7. The method as recited in claim 1, wherein said step (b) comprises comparing said first segment of said segments with said first portion of said actual unique word on a bit-by-bit basis so as to permit determination of said match between all bits of said first segment of said segments and respective bits of said first portion of said actual unique word.

8. The method as recited in claim 1, wherein said step (b) comprises comparing said first segment of said segments with said actual unique word on a bit-by-bit basis so as to permit determination of said match between a predetermined number of bits of said first segment of said segments with respective bits of said first portion of said actual unique word.

9. A unique word detector for detecting a unique word of M bits in a predetermined number of segments within a frame containing L bits of data, where M and L are integers greater than one and wherein M is less than L, said detector comprising:

first storage means for storing, responsive to a control signal, at least one segment of said data;

second storage means for storing an actual unique word;

comparison means for comparing said segment with said actual unique word responsive to said control signal to thereby determine satisfaction of predetermined match criteria; and control means for randomly generating said control signal.

10. The unique word detector as recited in claim 9, wherein said predetermined number is N, wherein said actual unique word comprises N portions, wherein said comparison means repetitively compares an ith segment of said N segments with a respective ith portion of said actual unique word, where N is an integer greater than 1 and wherein i is an integer less than or equal to N.

11. A unique word detector for detecting a unique word of M bits in a predetermined number of segments within a frame containing L bits of data, where M and L are integers greater than one and wherein M is less than L, said detector comprising:

first storage means for storing at least one segment of said data in response to a control signal;

second storage means for storing at least one portion of an actual unique word;

comparison means for comparing said segment with said portion responsive to said control signal to thereby determine satisfaction of predetermined match criteria; and control means for pseudorandomly generating said control signal.

12. The unique word detector as recited in claim 11, wherein said predetermined number is N, wherein said actual unique word comprises N portions, wherein said comparison means repetitively compares an ith segment of said N segments with a respective ith portion of said actual unique word, where N is an integer greater than 1 and wherein i is an integer less than or equal to N.

13. A decoder comprising:

a unique word detector for detecting a unique word of M bits in a predetermined number of segments within a frame containing L bits of data, where M and L are integers greater than one and wherein M is less than L, said unique word detector comprising:

first storage means for storing, responsive to a control signal, at least one segment of said data;

second storage means for storing an actual unique word;

comparison means for comparing said segment with said actual unique word responsive to said control signal to thereby determine satisfaction of predetermined match criteria and for detecting said unique word; and control means for generating said control signal in response to a selected one of a randomly generated number and a pseudo-randomly generated number; and decoding means for aligning said data in data frames responsive to detection of said unique word in said segments and for decoding said data frames.

14. The decoder of claim 13, wherein said predetermined number is N, wherein said actual unique word comprises N portions, wherein said comparison means repetitively compares an ith segment of said N segments with a respective ith portion of said actual unique word, where N is an integer greater than 1 and wherein i is an integer less than or equal to N.

15. The decoder of claim 14, wherein said control means is operatively coupled to said comparison means so as to permit said comparison means to provide said control means with a status signal indicative of comparison results between said ith segment of said N segments with said corresponding ith portion of said actual unique word.

16. A method of randomly detecting a unique word comprising M bits in a predetermined number of segments within a frame containing L bits of data, where M and L are integers greater than one and wherein M is less than L, said method comprising the steps of:

(a) randomly selecting an ith one of said segments from incoming data bits;

(b) comparing the ith segment with a respective portion of an actual unique word to determine if a match between said ith segment and said respective portion of said actual unique word exists;

(c) when said ith segment does not correspond to said respective portion of the actual unique word, discarding said ith segment and repeating said step (a);

(d) when a match is found between said ith segment and said respective portion of said actual unique word, determining whether said ith segment corresponds to a last portion of the actual unique word;

(e) when said ith segment does not correspond to said last portion, selecting a next ith segment and repeating step (b); and (f) when a comparison of said ith segment and said last portion of the actual unique word results in an appropriate match, declaring an acquisition.

* * * * *